(12) United States Patent
Hanson et al.

(10) Patent No.: US 6,928,683 B1
(45) Date of Patent: Aug. 16, 2005

(54) EXTENDABLE SUPPORT STRUCTURES

(76) Inventors: Stuart Craig Hanson, 2310 Brafton Ct., Acworth, GA (US) 30101; Frederik D. Penz, 1941 Fields Pond Dr., Marietta, GA (US) 30068

( * ) Notice: Subject to any disclaimer, the term of this patent is extended or adjusted under 35 U.S.C. 154(b) by 20 days.

(21) Appl. No.: 10/179,447

(22) Filed: Jun. 25, 2002

(51) Int. Cl.[7] .................. E01D 1/00; B62D 33/027
(52) U.S. Cl. .......................... 14/69.5; 296/61
(58) Field of Search ................ 14/69.5, 73.5; 414/537, 921; D34/32; 296/61

(56) References Cited

U.S. PATENT DOCUMENTS

| | | | |
|---|---|---|---|
| 713,561 A | * | 11/1902 | Doyen ............................ 14/45 |
| 960,022 A | * | 5/1910 | Kelemem et al. ............... 14/45 |
| 3,462,170 A | * | 8/1969 | Smith et al. .................. 280/166 |
| 3,579,184 A | * | 5/1971 | Forestal ....................... 340/470 |
| 3,797,952 A | * | 3/1974 | Pommerening et al. ........ 404/52 |
| 4,411,036 A | * | 10/1983 | Fitzgerald-Smith ........... 14/2.4 |
| 4,455,948 A | * | 6/1984 | Torres .......................... 108/44 |
| 4,473,916 A | * | 10/1984 | Connold ........................ 14/42 |
| 4,488,833 A | | 12/1984 | Perry et al. |
| 4,527,941 A | * | 7/1985 | Archer ....................... 414/537 |
| 4,571,144 A | * | 2/1986 | Guidry et al. .............. 414/537 |
| 4,628,561 A | | 12/1986 | Kushniryk |
| 4,864,673 A | | 9/1989 | Adaway et al. |
| 4,923,360 A | | 5/1990 | Beauchemin |
| 4,944,546 A | | 7/1990 | Keller |
| 5,062,174 A | | 11/1991 | DaSalvo |
| 5,156,432 A | | 10/1992 | McCleary |
| 5,224,584 A | * | 7/1993 | Best et al. ................... 198/782 |
| 5,244,335 A | | 9/1993 | Johns |
| 5,273,335 A | | 12/1993 | Belnap et al. |
| 5,312,148 A | | 5/1994 | Morgan |

(Continued)

FOREIGN PATENT DOCUMENTS

GB 2 000 207 * 1/1979

OTHER PUBLICATIONS

Ramon Sastre, "Expandable Arches," 1996, *School of Architecture of the Vallès. Department of Architectural Technology 1, Polytechnic University of Catalunya, Sant Cugat del Vallès, Spain.*

Primary Examiner—Gary S. Hartmann
(74) Attorney, Agent, or Firm—Withers & Keys, LLC

(57) ABSTRACT

Various types of extendable support structures provide a lateral dimension that is defined by at least one lazy tong, and the longitudinal dimension is variable by extension and retraction of the at least one lazy tong. The extendable structure may include a plurality of adjacent and attached lazy tongs that are capable of supporting a significant load through the interconnection of the adjacent lazy tongs forming the structure. The extendable structure may be fully retracted to minimize the longitudinal dimension and thereby provide a compact structure, such as one that can be easily transported or stored. The extendable structure may be extended to a length as required for a particular purpose and limited to a maximum longitudinal dimension when the structure is being used to support a load. As such the various types of extendable support structures may be used in many scenarios, such as for providing a loading ramp, bridge, walkway, or working surface.

28 Claims, 18 Drawing Sheets

U.S. PATENT DOCUMENTS

| | | |
|---|---|---|
| 5,671,496 A | 9/1997 | Smith |
| 5,803,523 A | 9/1998 | Clark et al. ................. 296/26.1 |
| 5,853,281 A * | 12/1998 | Farmer ....................... 414/537 |
| 5,988,725 A | 11/1999 | Cole |
| 6,099,233 A | 8/2000 | Craik |
| 6,293,748 B1 | 9/2001 | Savaria |

* cited by examiner 2002
2000
2004

2002'
2000'

EXTENDABLE SUPPORT STRUCTURES

TECHNICAL FIELD

The present invention relates to support structures. More specifically, the present invention relates to support structures that can be extended and retracted.

BACKGROUND

Support structures are used to sustain a load either continuously or over repeated intervals. For example, a floor structure may be used to continuously sustain a load provided by the gravitational force of static objects placed on the floor structure. Bridges are used to sustain a load over repeated intervals, such as when objects repeatedly travel across the bridge. Loading ramps are used to sustain a load as objects pass up or down the loading ramp. Likewise, walls may sustain a load parallel to the ground such as heavy winds or moving objects contacting the walls.

In certain situations, support structures such as these discussed above may indefinitely remain in a static condition. However, other applications for a support structure may require that it be extendable and retractable for various reasons. As one example, it may be a requirement that a support structure be portable, and to enhance the portability of the structure it may be desirable to reduce the lengthiest dimension of the structure-by retracting it when it must be transported. Then, when the structure is positioned where it must support a load, the structure is extended so that the load can be placed on the structure.

Providing a support structure that can be retracted and extended as necessary requires that the support structure not be a rigid unitary structure. Instead, the support structure must provide retractability and extendibility by incorporating flexibility into the design. However, the support structure must also be able to sustain the particular load that will be applied to the structure. Thus, such a support structure must address at least these two contradictory constraints.

SUMMARY

Embodiments of the present invention address these and other problems by providing a structure that is expandable from a retracted position so that a longitudinal dimension of the extendable support structure is variable. The extendable support structure may be retracted and expanded as necessary while providing support for a load when in an expanded state that may range up to a maximum longitudinal dimension.

One embodiment of the present invention is an extendable support structure that includes adjacent lazy tongs that provide a lateral dimension to the support structure. The adjacent lazy tongs extend to provide the variable longitudinal dimension and the adjacent lazy tongs are fixed together laterally at at least one point.

Another embodiment of the present invention is an extendable support structure that includes at least one lazy tong that provides the lateral dimension and has non-linear members, and the at least one lazy tong extends to provide a variable longitudinal dimension. The at least one lazy tong has a curvature present on at least one end of each non-linear member. The curvature limits the longitudinal dimension by abutting another member when the at least one lazy tong is extended to maximize the longitudinal dimension.

Another embodiment of the present invention is an extendable support structure that includes at least one lazy tong that provides the lateral dimension and has non-linear members. The at least one lazy tong extends to provide a variable longitudinal dimension. At least one end portion with a catch is connected to and is angled in relation to a central portion for each non-linear member. Each central portion has a notch in at least one side, and the notch accepts a catch from another non-linear member of the at least one lazy tong when the at least one lazy tongs is extended to maximize the longitudinal dimension.

Another embodiment of the present invention is an extendable support structure that includes at least one lazy tong that provides a lateral dimension. The at least one lazy tong extends to provide a variable longitudinal dimension, and the at least one lazy tong forms an arc over at least a portion of the longitudinal dimension when extended.

DETAILED DESCRIPTION

Embodiments of the present invention provide adjacent lazy tongs of various configurations that form an extendable support structure. The adjacent lazy tongs allow the structure to extend and retract as desired by the user while sustaining loads applied to the surface of the adjacent lazy tongs. Therefore, the extendable support structure is beneficial in that it is not permanently fixed in its extended state and can be retracted for various reasons such as to store or transport the support structure.

The lazy tongs that are included in embodiments of the extendable support structure are jointed extensible frameworks. Traditionally, lazy tongs have one end adapted to grasp an object and another end used by an operator to trigger the extension or retraction of the lazy tongs. Thus, the user can extend the lazy tongs to grasp an object at a distance from the user to bring the object closer. As used herein, the term lazy tongs refers to the jointed extensible framework and does not require that the jointed extensible framework include an end used for grasping or an end used as a handle for triggering extension or retraction.

Where adjacent lazy tongs are included in the embodiments of the present invention, they are positioned adjacently to provide the lateral dimension of the support structure. In the embodiments where multiple lazy tongs are used, they are adjacent and are interconnected in various ways discussed herein to fix the structure's lateral dimension and to coordinate the extension of the adjacent lazy tongs to vary the longitudinal dimension of the support structure. The at least one lazy tong of the embodiments directly supports loads that are applied to the support structure where the loads create a force component that is perpendicular to both the lateral and longitudinal dimension of the support structure.

Figure 1:
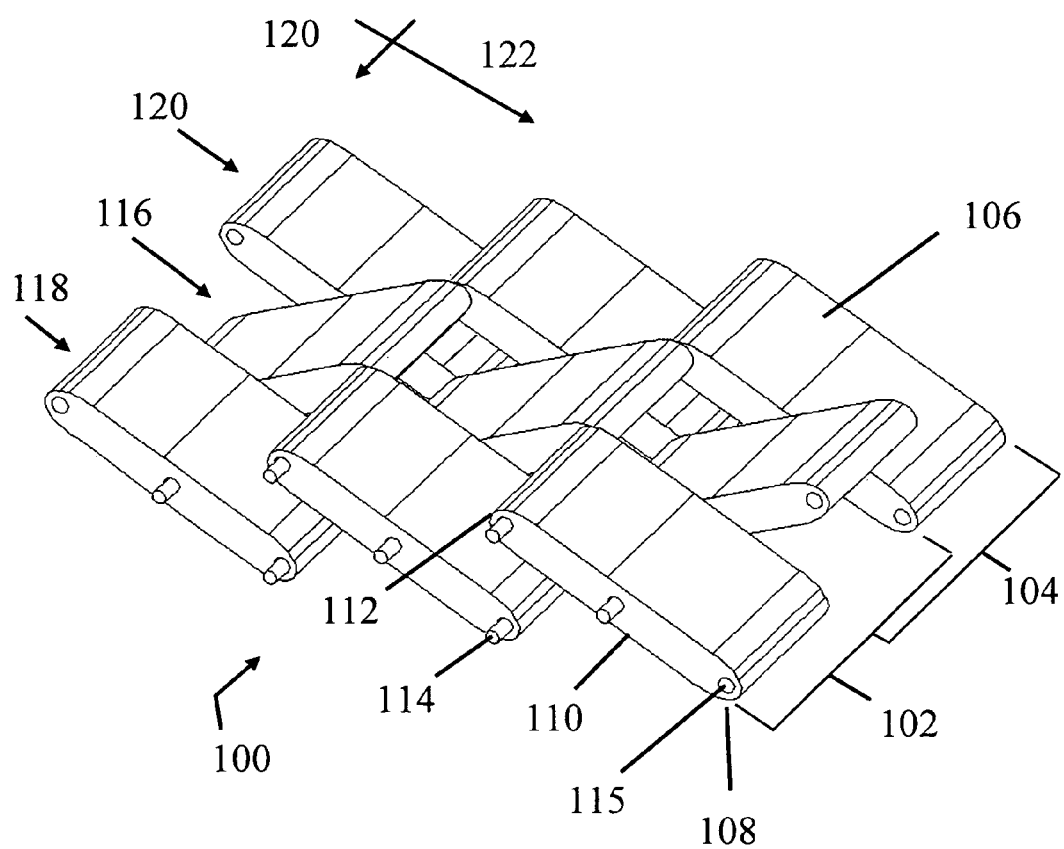
FIG. 1 is a perspective view of one embodiment of the present invention.
Figure 2:
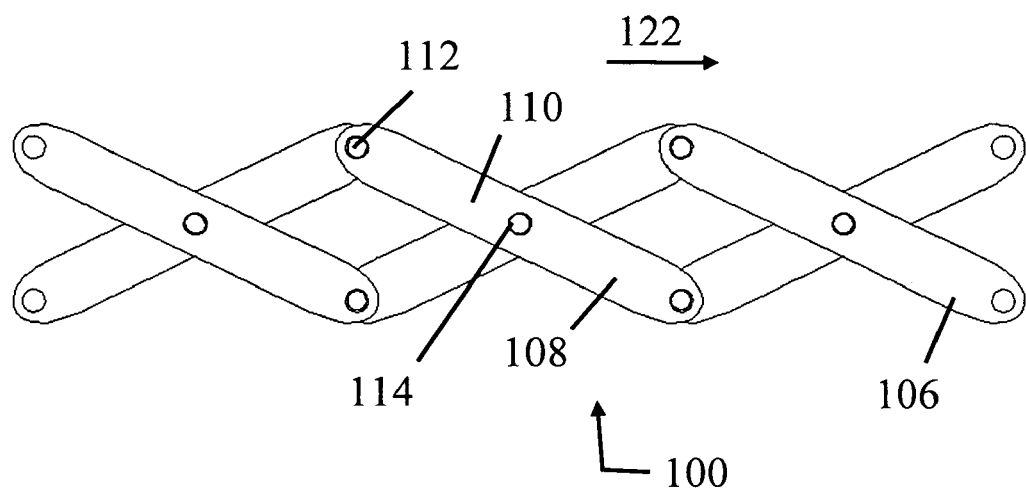
FIG. 2 is a plane view of the embodiment of FIG. 1.

One embodiment of the extendable support structure 100 is shown in FIGS. 1 and 2. The extendable support structure 100 includes adjacent lazy tongs 102 and 104 that are formed by a series of members 106 that are jointed together, where each lazy tong 102, 104 is defined by two member widths. Lazy tong 102 includes members 106 forming a row 118 defined by one member width that are pivotally connected to members 106 that form a row 116 also defined by one member width. The adjacent lazy tong 104 is formed of members 106 forming a row 120 defined by one member width that are pivotally connected to members 106 that form the row 116. Thus, the row 116 forms a portion of both the two adjacent lazy tongs 102 and 104.

Two lazy tongs 102, 104 are shown in FIG. 1 for illustrative purposes only, and one skilled in the art will recognize that many rows of members may be included in a repeating pattern to form several adjacent lazy tongs. The lateral dimension 124 of the extendable support structure 100 is defined by the number of members 106 that are adjacent in the lateral direction, where the number of members 106 define the total number of lazy tongs that are present. As is well known, lazy tongs are extensible, and therefore, the extendable support structure 100 has a longitudinal dimension 122 that is variable depending upon whether the structure 100 is fully retracted or extended to some degree. As shown, the structure 100 is partially extended to provide a truss-like configuration discussed in more detail with reference to FIG. 3.

Each member 106 has a first end 108, a central portion 110, and a second end 112. The support structure embodiment 100 provides linear members 106. As discussed below, the members 106 may have non-linear shapes as well. The members 106 of this embodiment 100 have holes 115 that allow pins 114 to pass through in the lateral dimension 124. The pins 114 pass through the holes 115 of the members 106 for each row 116, 118, and 120. Therefore, the adjacent lazy tongs 102 and 104 are fixed together at several points by the pins 114, and the adjacent lazy tongs 102, 104 cooperate to extend and retract together as a unit.

One skilled in the art will recognize that the adjacent lazy tongs of present in embodiments discussed herein may be attached at fewer than every point shown in FIGS. 1 and 2, such as by using pins that do not extend through every member 106 across the lateral dimension 124. For example, if an embodiment has four member widths to the lateral dimension 124 instead of three member widths as shown in FIG. 1, certain pins 114 may extend through the first two member widths and other pins may extend through the third and fourth member widths. At least one pin 114 extends between the second and third member widths to establish at least one fixed point between the lazy tong formed by the first two member widths and lazy tong formed by the last two member widths.

Figure 3:
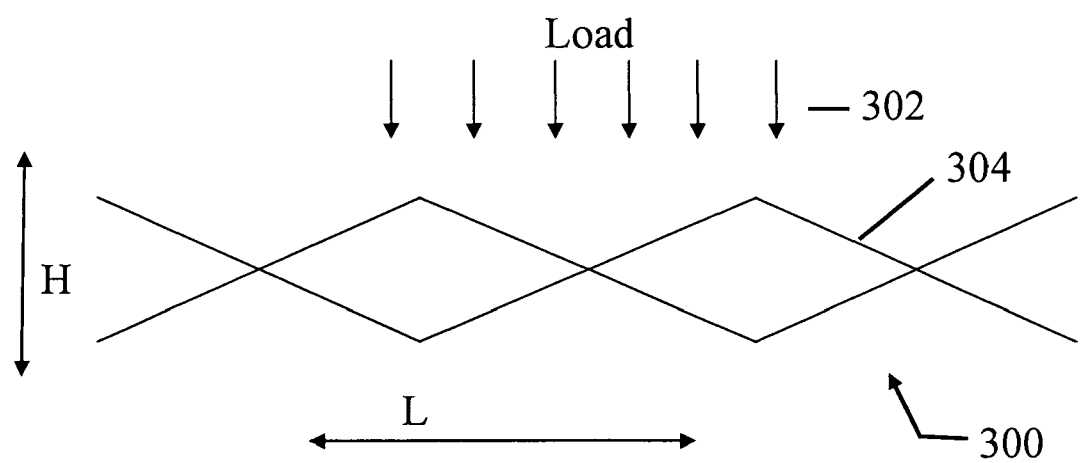
FIG. 3 is a diagram illustrating a truss-like configuration for the distribution of a load applied to the embodiment of FIG. 1.

FIG. 3 shows a diagram 300 of the distribution of force relative to the truss-like configuration 304 of the embodiment 100 when partially extended. The load 302 supplies a component of force that is perpendicular to both the lateral dimension 124 and longitudinal dimension 122 of FIG. 1. The load 302 is distributed throughout the truss-like configuration 304, as forces are generated through the pins 114 and members 106 of the structure 100.

As the height H of the truss-like configuration 304 increases, which results from some retraction and a corresponding decrease in the length L in the longitudinal dimension 122, the load carrying capacity increases. As the length L of the truss-like configuration 304 increases, which results from some extension and a corresponding decrease in the height H, the load carrying capacity decreases. As H divided by L approaches zero (i.e., maximum extension approached resulting in a flat structure), there is no structural advantage otherwise provided by the truss-like configuration 304.

Figure 4:
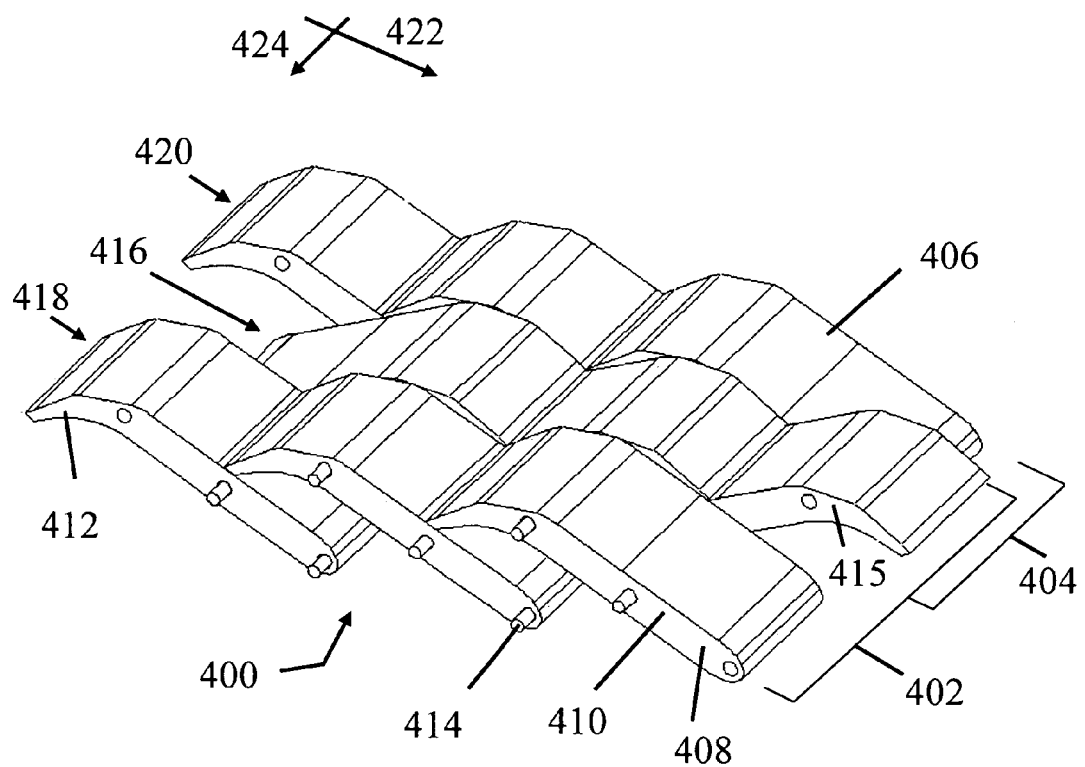
FIG. 4 is a perspective view of a second embodiment of the present invention.
Figure 5:
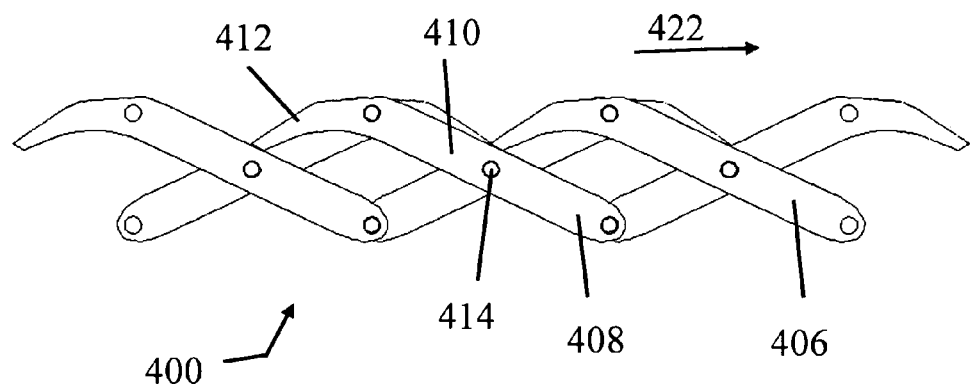
FIG. 5 is a plane view of the embodiment of FIG. 4.

FIGS. 4 and 5 show another support structure embodiment 400 that provides a maximum extension limitation to promote the benefit from the truss-like configuration and to further absorb a compression load. The compression loading increases the moment of inertia of the structure 400 to provide a T-beam type of structure and load dispersion. The extendable support structure 400 includes adjacent lazy tongs 402 and 404 that are formed by a series of members 406 that are jointed together. Lazy tong 402 includes members 406 forming a row 418 that are pivotally connected to members 406 that form a row 416. The adjacent lazy tong 404 is formed of members 406 forming a row 420 that are pivotally connected to members 406 that form the row 416. Thus, the row 416 forms a portion of the two adjacent lazy tongs 402 and 404.

Similar to FIG. 1, two lazy tongs 402, 404 are shown in FIG. 4 for illustrative purposes only, but one skilled in the art will recognize that any number of lazy tongs may be included in the support structure 400. The lateral dimension 424 of the extendable support structure 400 is defined by the number of members 406 that are adjacent in the lateral direction 422, where the number of members 406 define the total number of lazy tongs that are present. The lazy tongs 402, 404 are extensible, and therefore, the extendable support structure 400 has a longitudinal dimension 422 that is variable depending upon whether the structure 400 is fully retracted or extended to some degree. As shown, the structure 400 is fully extended to provide a truss-like configuration and compression loading discussed in more detail with reference to FIG. 6.

Each member 406 has a first end 408, a central portion 410, and a curvature 412 that causes each member 406 to be non-linear and asymmetrical. The members 406 of this embodiment 400 have holes 415 that allow pins 414 to pass through. The pins 414 pass through the holes 415 of the members 406 for each row 416, 418, and 420. Therefore, the adjacent lazy tongs 402 and 404 cooperate to extend and retract together as a unit. When extending the structure 400, the curvature 412 of one member 406 will eventually contact the next member 406 of the same row, which is most evident in FIG. 5. The contact of the curvature 412 to the member 406 prevents further extension. One skilled in the art will recognize that symmetrical non-linear members having curvatures on both sides of the central portion 410 may also be used.

Figure 6:
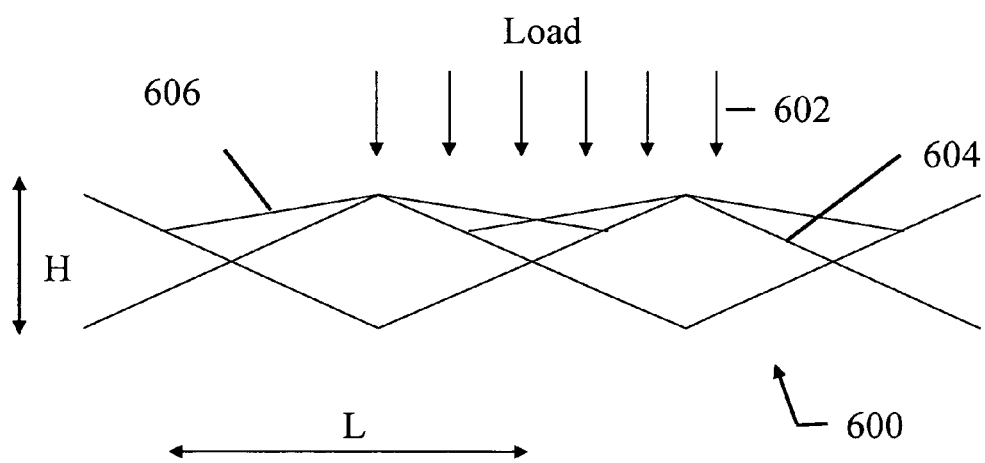
FIG. 6 is a diagram illustrating the truss-like configuration and compression loading for the distribution of a load applied to the embodiment of FIG. 4.

FIG. 6 shows a diagram 600 of the distribution of force relative to the truss-like configuration 604 of the embodiment 400 when partially extended. The load 602 supplies a component of force that is perpendicular to both the lateral dimension 424 and longitudinal dimension 422 of FIG. 4. The load 602 is distributed throughout the truss-like configuration 604, as forces are generated through the pins 414 and members 406 holding the structure 400 together.

Again, as the height H of the truss-like configuration 604 increases, which results from some retraction and a corresponding decrease in the length L in the longitudinal dimension 422, the load carrying capacity increases. As the length L of the truss-like configuration 604 increases, which results from some extension and a corresponding decrease in the height H, the load carrying capacity decreases. Because the maximum extension occurs prior to the structure 400 becoming flat, the truss-like configuration 604 is preserved, and the resulting structural advantage is maintained regardless of whether the curvature 412 is present on the side where the load is applied or on the opposite side.

When the load is applied to the same side of the structure 400 as the curvatures 412, a compression loading 606 occurs at maximum extension of the structure 400. The compression loading 606 results in a decrease of the force through the pins 414 that hold the structure 400 together. As discussed above, the structure 400 provides an increased moment of inertia and provides a T-beam type of structure when fully extended due to the contact of the curvature 412 resulting in the compression loading 606.

Figure 7:
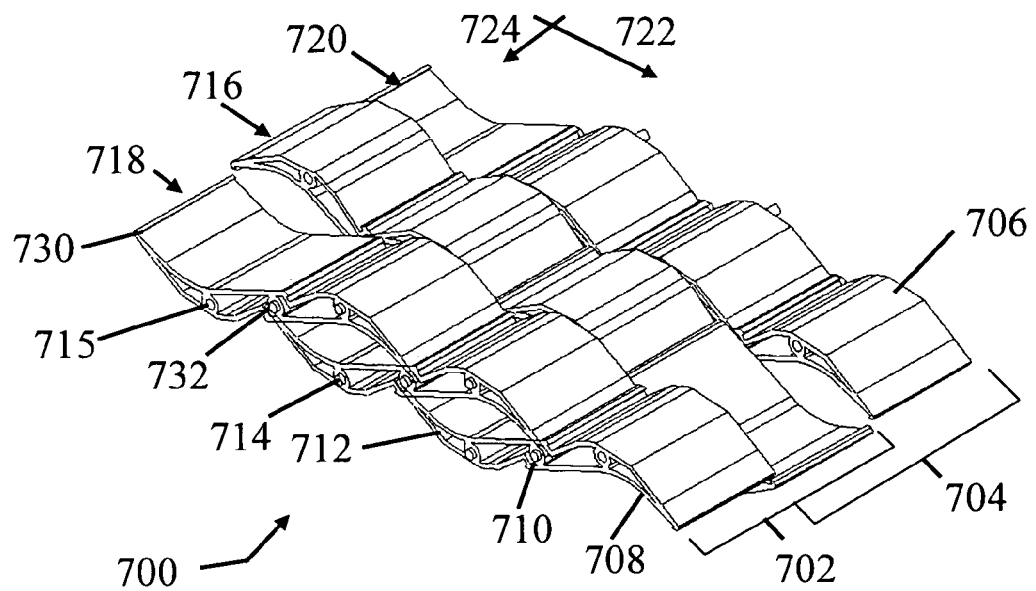
FIG. 7 is a perspective view of a third embodiment of the present invention.
Figure 8:
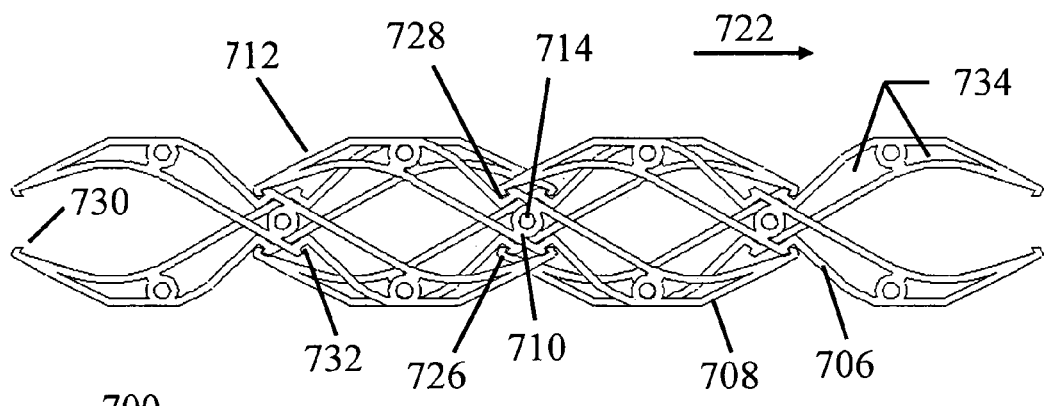
FIG. 8 is a plane view of the embodiment of FIG. 7.

FIGS. 7 and 8 show another support structure embodiment 700 that provides a maximum extension limitation to promote the benefit from the truss-like configuration and to further absorb a compression load and a tension load. The compression and tension loading further increase the moment of inertia of the structure 700 thereby forming an I-beam type of structure and load dispersion. The extendable support structure 700 includes adjacent lazy tongs 702 and 704 that are formed by a series of members 706 that are jointed together. Lazy tong 702 includes members 706 forming a row 718 that are pivotally connected to members 706 that form a row 716. The adjacent lazy tong 704 is formed of members 706 forming a row 720 that are pivotally connected to members 706 that form the row 716. Thus, the row 716 forms a portion of the two adjacent lazy tongs 702 and 704.

Similar to FIGS. 1 and 4, two lazy tongs 702, 704 are shown in FIG. 7 for illustrative purposes only, and one skilled in the art will recognize that any number of lazy tongs may be included in the support structure 700. The lateral dimension 724 of the extendable support structure 700 is defined by the number of members 706 that are adjacent in the lateral direction 722, where the number of members 706 define the total number of lazy tongs that are present. The lazy tongs 702, 704 are extensible, and therefore, the extendable support structure 700 has a longitudinal dimension 722 that is variable depending upon whether the structure 700 is fully retracted or extended to some degree. As shown, the structure 700 is fully extended to provide a truss-like configuration and both compression and tension loading discussed in more detail with reference to FIG. 9.

Each member 706 has a central portion 710, a first portion 708 angled relative to the central portion 710, and a second portion 712 also angled with respect to central portion 710. First and second portions 708, 712 form curvatures that cause each member 706 to be non-linear. The members 706 of this embodiment 700 have holes 715 that allow pins 714 to pass through. The pins 714 pass through the holes 715 of the members 706 for each row 716, 718, and 720. Therefore, the adjacent lazy tongs 702 and 704 cooperate to extend and retract together as a unit.

When extending the structure 700, catches 730 located on or near the end portions 708, 712 of one member 706 will eventually be received by notches 732 located on the next members 706 of the same row at some point between the center and the endpoints of the next members 706. This is most evident in FIG. 8, where the notches are shown in the central portion 710 only as an example. One skilled in the art will appreciate that to maximize the compression and tension loading, it is desirable to extend the mating point of the notch with the catch as far as possible from the center of the members 706 in the direction perpendicular to the lateral and longitudinal dimensions 724, 722 of the structure 700. The mating of the catches 730 to the notches 732, such as at points 726 and 728, prevents further extension of the structure 700.

Figure 9:
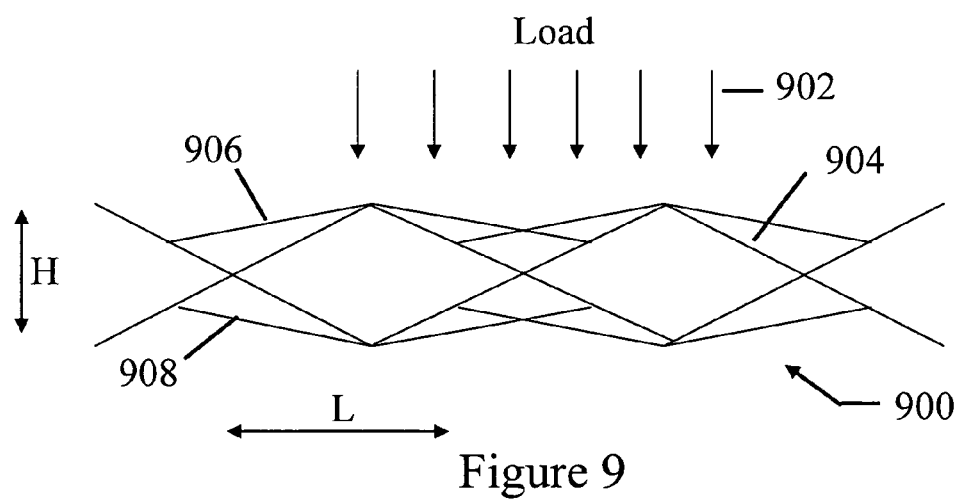
FIG. 9 is a diagram illustrating the truss-like configuration and the compression and tension loading for the distribution of a load applied to the embodiment of FIG. 7.

FIG. 9 shows a diagram 900 of the distribution of force relative to the truss-like configuration 904 of the embodiment 900 when at least partially extended. The load 902 supplies a component of force that is perpendicular to both the lateral dimension 724 and longitudinal dimension 722 of FIG. 7. The load 902 is distributed throughout the truss-like configuration 904, as forces are generated through the pins 714 and members 706 of the structure 700.

Again, as the height H of the truss-like configuration 904 increases, which results from some retraction and a corresponding decrease in the length L in the longitudinal dimension 722, the load carrying capacity increases. As the length L of the truss-like configuration 904 increases, which results from some extension and a corresponding decrease in the height H, the load carrying capacity decreases. Because the maximum extension occurs prior to the structure 700 becoming flat, the truss-like configuration 904 is preserved, and the resulting structural advantage is maintained.

Additionally, compression loading 906 and tension loading 908 occurs at maximum extension of the structure 700. The compression loading 906 and tension loading 908 result in a decrease of the force through the pins 714 that hold the structure 700 together. The structure 700 acts as an I-beam type of structure when fully extended due to the contact of the catches 730 being received in the notches 732 resulting in the compression loading 906 and tension loading 908. One skilled in the art will recognize that non-symmetrical members 706 having only one portion 708 or 712 angled with respect to the central portion 710 may also be used, and the one portion 708 or 712 can be positioned on the same side as the load to provide compression loading 906 or positioned on the opposite side as the load to provide tension loading 908.

Figure 10:
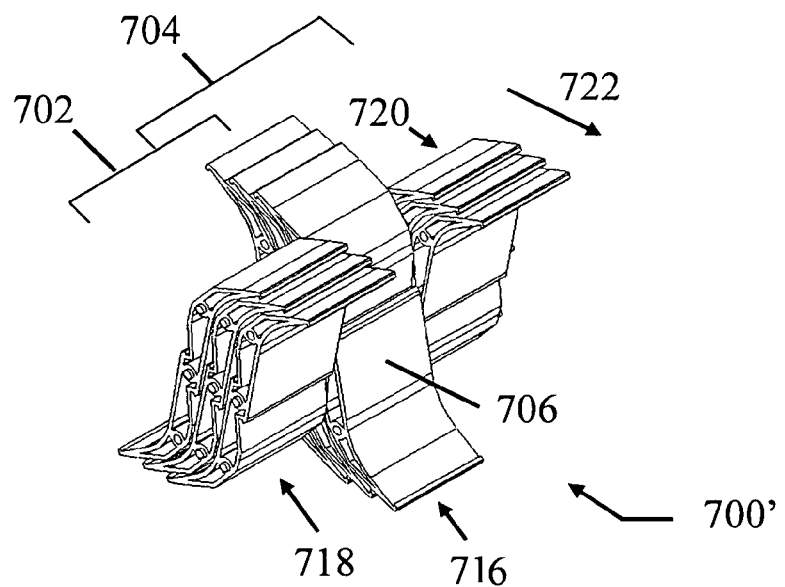
FIG. 10 is a perspective view of the embodiment of FIG. 7 in a fully retracted position.

FIG. 10 shows the extendable support structure embodiment 700' in its fully retracted state. As can be seen by comparison of the retracted embodiment 700' to the extended embodiment 700 of FIG. 7, the longitudinal dimension of the embodiment 700' is much shorter. It will be apparent to one skilled in the art that the other various embodiments described herein also have a retracted state as shown in FIG. 10 for the embodiment 700'.

Figure 11:
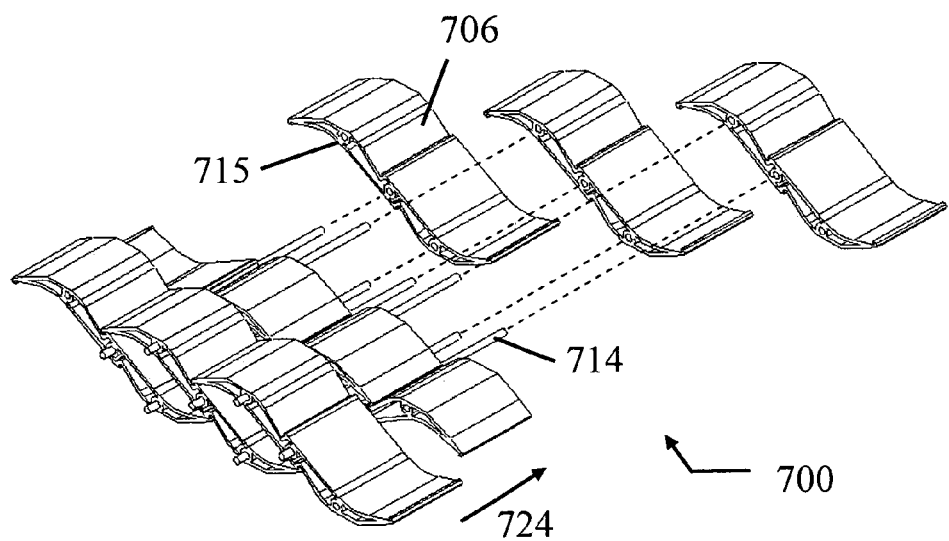
FIG. 11 is a partially exploded perspective view illustrating typical assembly of the embodiment of FIG. 7.

FIG. 11 shows the extendable support structure 700 partially exploded while in its extended state. Each member 706 has holes 715 that slide onto a pin 714 that extends across the lateral dimension 724 when the extendable support structure 700 is being assembled. The members 706 of this embodiment as well as the members of the other embodiments described herein may be made from various materials such as casted or machined metals, from carbon composites, or from plastics such as by injection molding. The pins 714 may be made from various materials such as metal or carbon composites. The members may be solid except for the holes 715 or may have voids 734 as best shown in FIG. 8.

Figure 12:
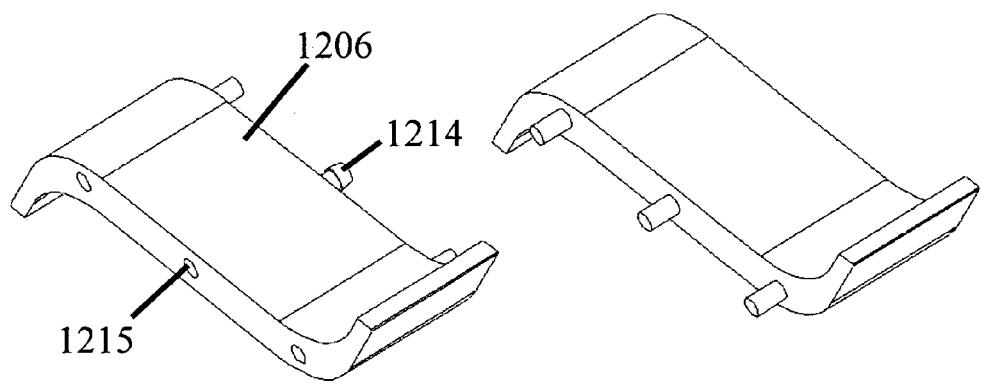
FIG. 12 is a perspective view of members of one embodiment of the present invention that utilize integral pin attachments.

FIG. 12 shows an example of a member 1206 of one embodiment that uses integral pin attachments rather than pins spanning the lateral dimension. The integral pin attachments are formed by integral pins 1214 that extend from one side of the member 1206 and receptacles 1215 that are positioned on the opposite side. The integral pin 1214 of one member is disposed in a receptacle 1215 of an adjacent member 1206. The integral pin attachments allow the adjacent lazy tongs of the extendable support structure to extend and retract in the same manner as the embodiments using pins passing through holes in the members.

Figure 13:
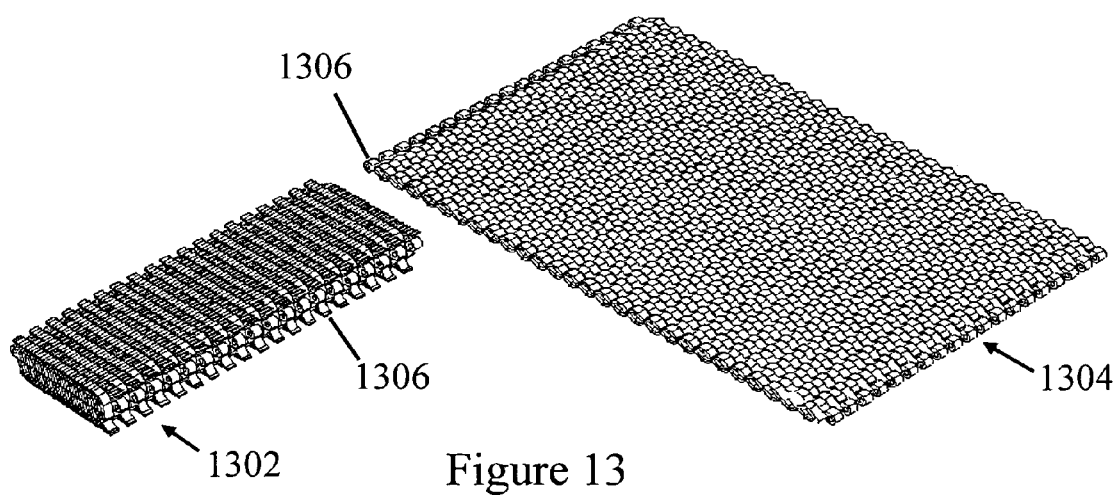
FIG. 13 is a perspective view of two extendable support structure embodiments, where one structure is fully retracted and the other is fully extended.

FIG. 13 shows two extendable support structures side by side where one structure 1302 is fully retracted and another structure 1304 is fully extended. The ratio of extension can be altered based upon the length of the individual members that make up the lazy tongs of the structures 1302, 1304. The structures 1302, 1304 show examples having many more adjacent lazy tongs than the two adjacent lazy tongs of FIGS. 1, 4, and 7. Thus, as can be seen the lateral dimension of the extendable support structure can be set as needed for a particular application based upon the number of adjacent lazy tongs that are included.

Figure 14:
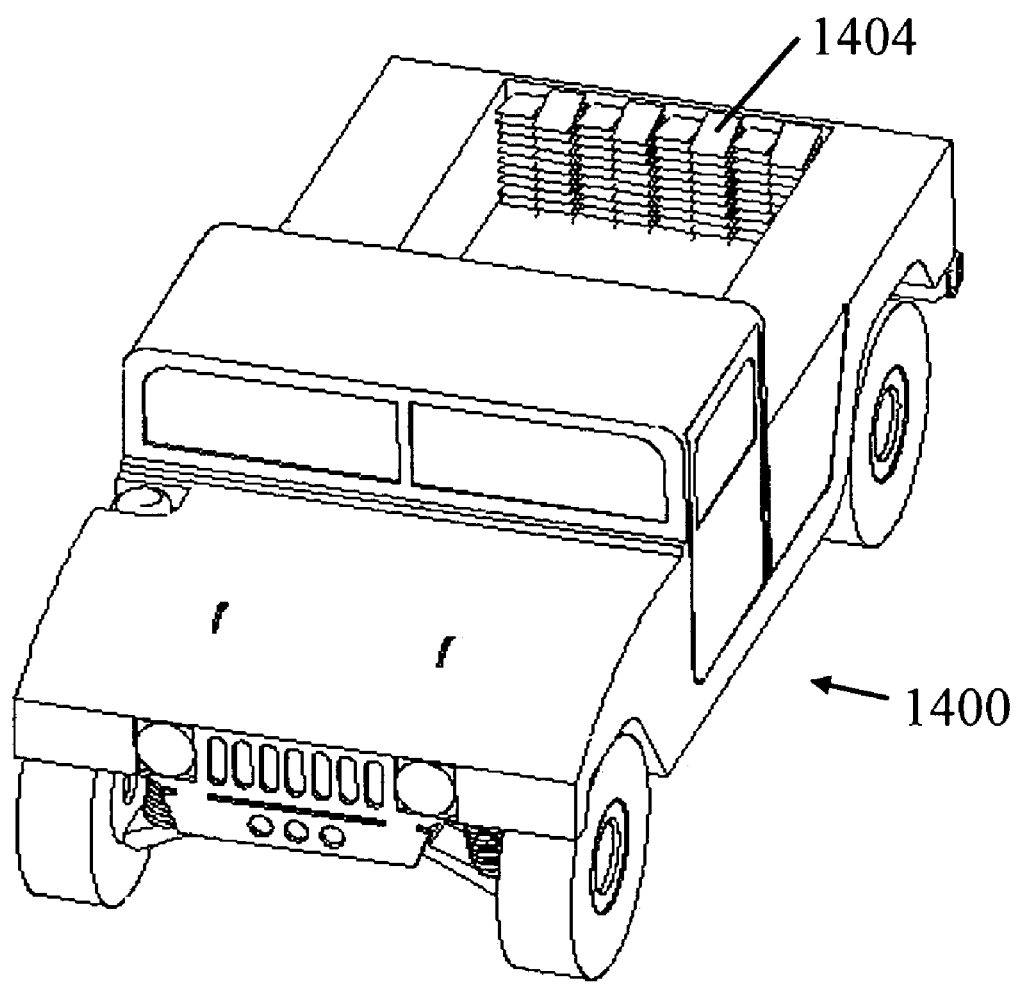
FIG. 14 is a perspective view of a vehicle that has an embodiment of the extendable support structure attached to a tailgate in a retracted state.

FIG. 14 shows one application for an embodiment of an extendable support structure. A vehicle 1400 such as a truck has a tailgate 1402 (more clearly shown in FIGS. 15–17). An extendable support structure 1404 is pivotally attached to the tailgate at one end, typically the top end of the tailgate 1402. When the extendable support structure 1404 is in a fully retracted state as shown in FIG. 14, the tailgate 1402 can be closed.

Figure 15:
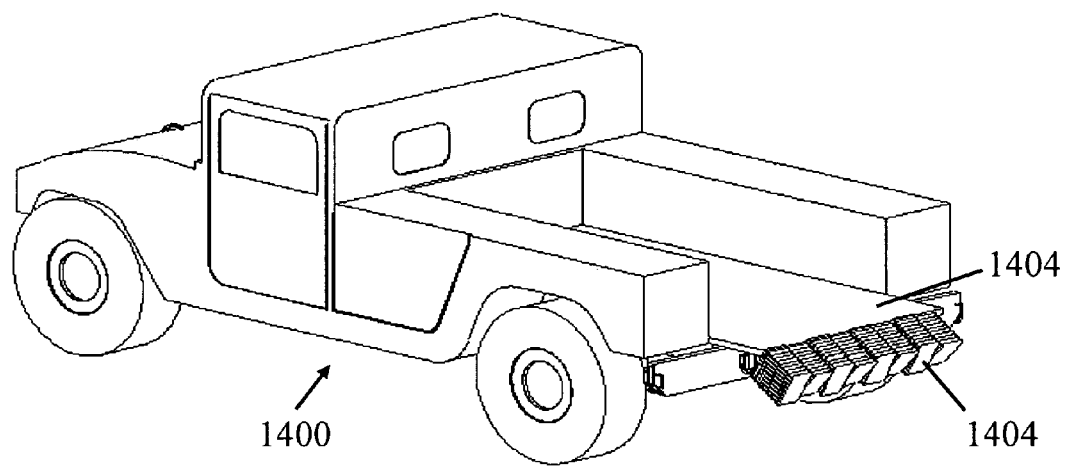
FIG. 15 is a perspective view of the vehicle of FIG. 14 that has the extendable support structure pivoted away from the open tailgate while in the retracted state.
Figure 16:
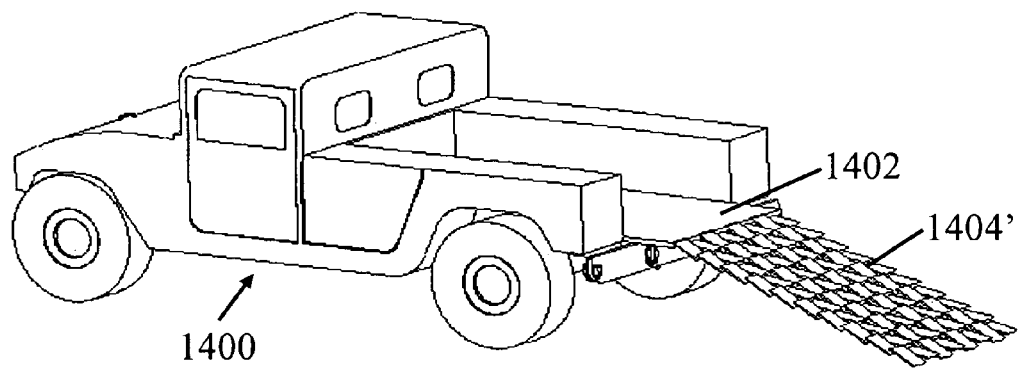
FIG. 16 is a perspective view of the vehicle of FIGS. 14 and 15 that has the extendable support structure pivoted away from the open tailgate while in an extended state to form a loading ramp.

When the extendable support structure 1404 is to be used, the tailgate may be opened and the structure 1404 pivoted away from the tailgate 1402 as shown in FIG. 15. Then, the extendable support structure 1404 can be extended by the user pulling on its free end away from the truck 1400 until the structure 1404 has reached a suitable extended state 1404', as shown in FIG. 16. The free end of the structure 1404 can be positioned on the ground or other surface, and then the structure 1404' can be used as a loading ramp or bridge to and from the bed of the truck 1400. Afterwards, the structure 1404' can be stored by pushing the free end back toward the truck to retract the structure 1404', pivoting the retracted structure 1404 back toward the tailgate 1402, and then closing the tailgate 1402.

Figure 17:
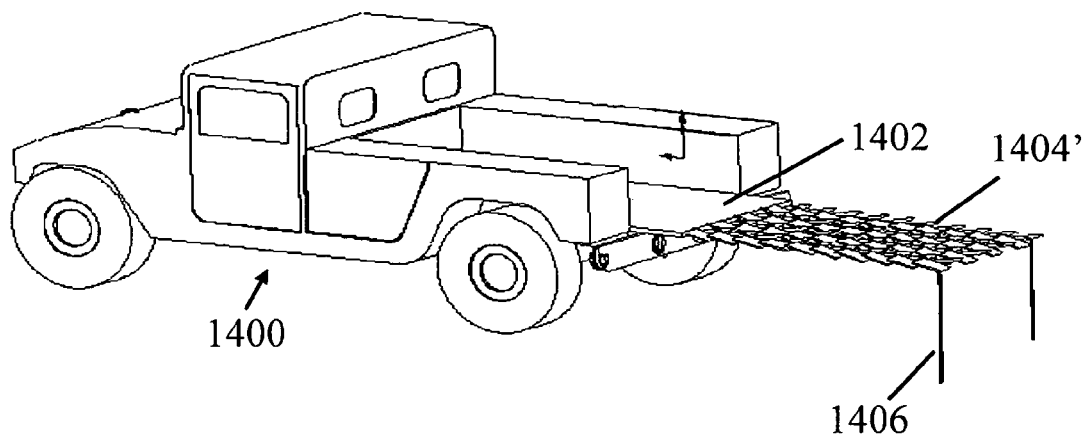
FIG. 17 is a perspective view of the vehicle of FIGS. 14–16 that has the extendable support structure pivoted away from the open tailgate while in an extended position with legs attached to the structure to form a table.

As shown in FIG. 17, the extended structure 1404' may be provided with legs 1406 so that the structure 1404' acts as a table when extended. One skilled in the art will recognize that there are many uses for the extendable support structure embodiments discussed herein and that the examples shown in FIGS. 14–17 are for illustrative purposes only. Some additional uses include but are not limited to a safety mat for changing a tire on a soft shoulder of a roadway, evacuation ramps for aircraft, safety gates, awnings, and temporary barricades or ceilings.

Figure 27:
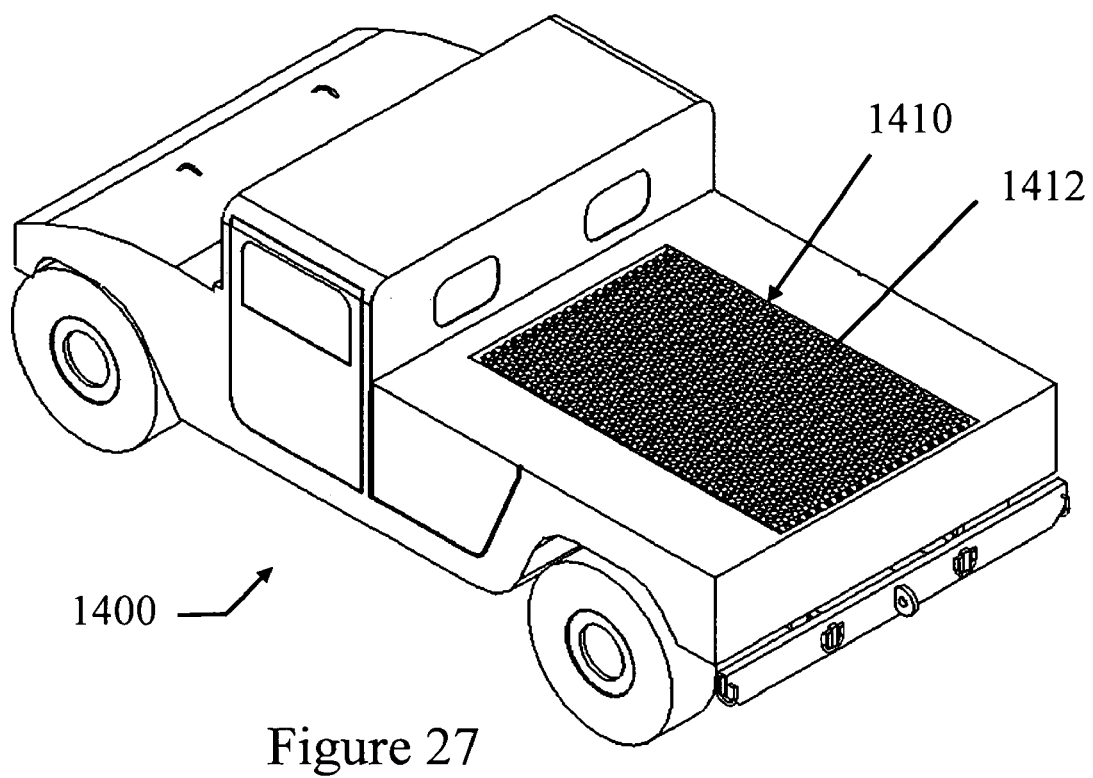
FIG. 27 is a perspective view of a vehicle that has an embodiment of the extendable support structure attached to a truck bed as a cover in an extended state.

FIG. 27 shows another application of an extendable support structure in relation to a truck 1400. The truck 1400 has a truck bed 1410. An extendable support structure 1412 shown in its extended state can be placed atop the truck bed 1410 to form an extendable truck bed cover. The truck bed cover may provide several advantages, such as reducing the aerodynamic drag presented by a truck bed 1410 that is not covered. When objects are to be placed in the truck bed 1410, the extendable support structure 1412 may be retracted to some degree to expose the truck bed 1410 and then extended to cover the truck bed 1410 and objects that it contains. Thus, the extendable truck bed cover structure 1412 can provide protection and/or security for the objects within the truck bed 1410. Additionally, the structure 1412 may provide a surface upon which additional objects may be placed and secured, thus effectively increasing the surface area of the truck bed 1410.

Figure 18:
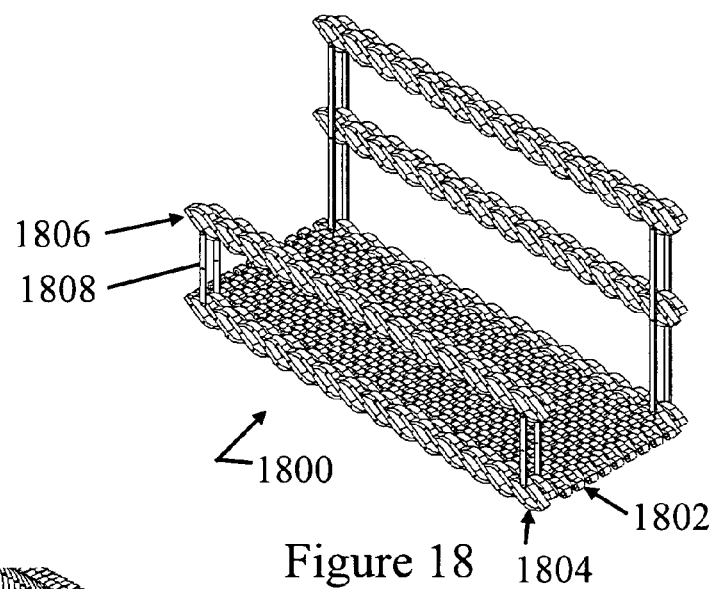
FIG. 18 is a perspective view of an extendable support structure embodiment in its extended state that may be used for various purposes and that includes rails and members having multiple sizes.

FIG. 18 illustrates an additional application of an extendable support structure 1800. The structure 1800 is suitable for various uses, including a bridge, scaffold, or swing stage. The support structure 1800 provides an extendable floor support structure 1802. The floor structure 1802 includes adjacent lazy tongs having members of one particular size. The floor structure 1802 is bounded by extendable support structures 1804 that includes adjacent lazy tongs having members of a size different than the size of the members of floor structure 1802. The different size members are established by proportioning the hole centers in the members of the structure 1804 to mate with at least some of the pins passing through the lateral dimension of the floor structure 1802.

Figure 19:
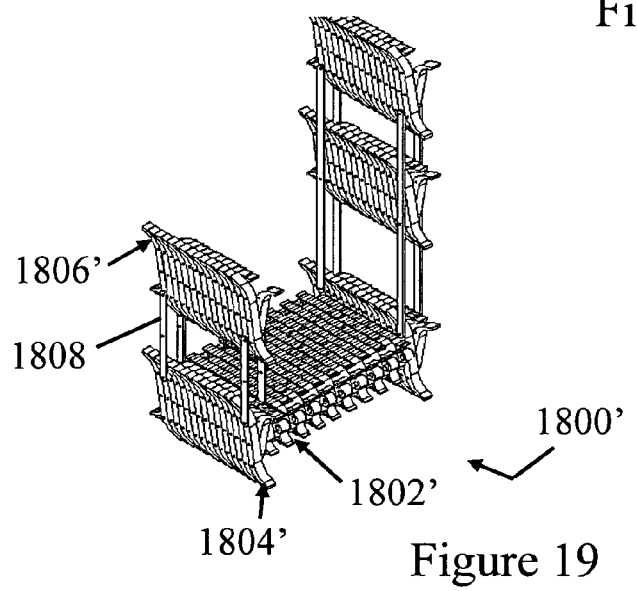
FIG. 19 is a perspective view of the extendable support structure of FIG. 18 in its retracted state.

The example in FIG. 18 includes an extendable rail support structure 1806 suspended above the floor structure 1802 by posts 1808. When an individual is standing on or walking across the support structure 1800, the rails 1806 provide stability and act as a barrier. When the support structure 1800 can be retracted, all of the individual extendable support structures retract to establish the retracted support structure 1800' of FIG. 19. This structure 1800' includes a retracted floor structure 1802', retracted boundary structure 1804', and retracted rail structure 1806'.

Figure 20:
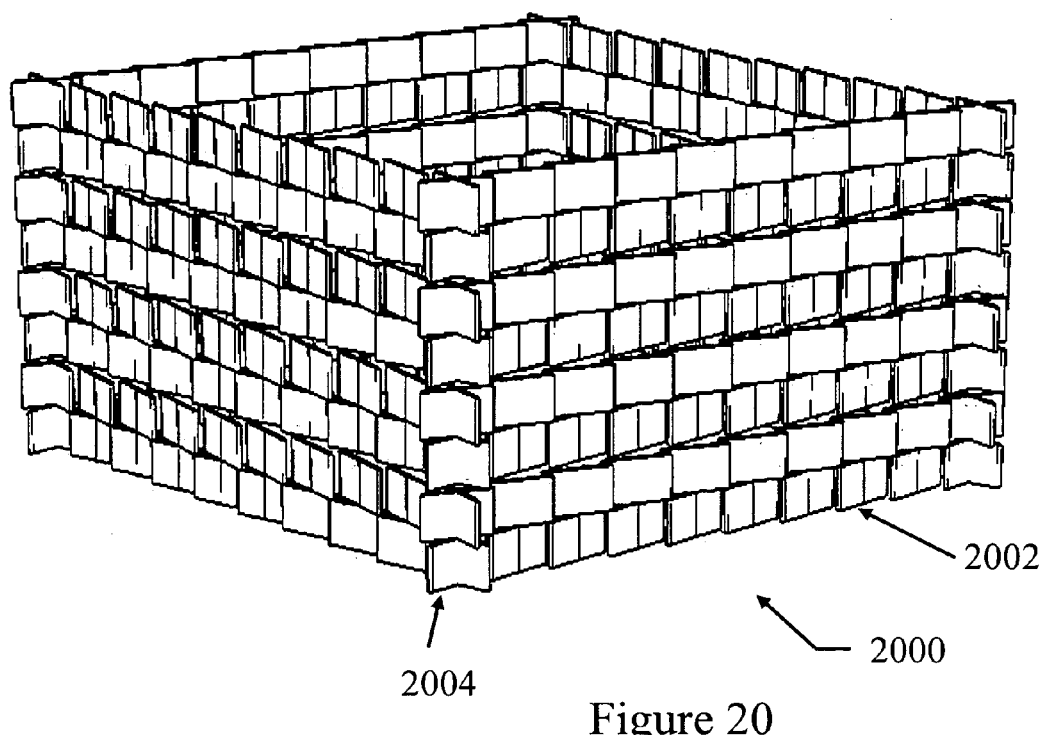
FIG. 20 is a perspective view of an expandable room having four extendable walls that are in their extended state and include an embodiment of an extendable support structure.
Figure 21:
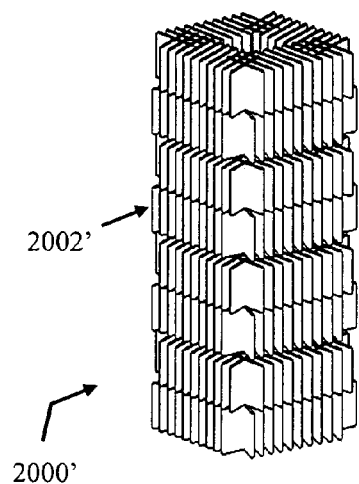
FIG. 21 is a perspective view of the expandable room of FIG. 20 where the four extendable walls are in their retracted state.

FIG. 20 shows another example of an application for the extendable support structure embodiments. In this example, the extendable support structure forms four walls 2002 that are connected to produce an expandable room 2000. Because all four walls of the room are extendable, the corners 2004 may be fixed once the room has been expanded so that force against a particular wall 2002 toward the center of the room does not cause the adjacent walls 2002 to retract. One skilled in the art will recognize that one or more walls may be an extendable support structure rather than all four. FIG. 21 shows the retracted room 2000' with retracted walls 2002'.

Figure 22:
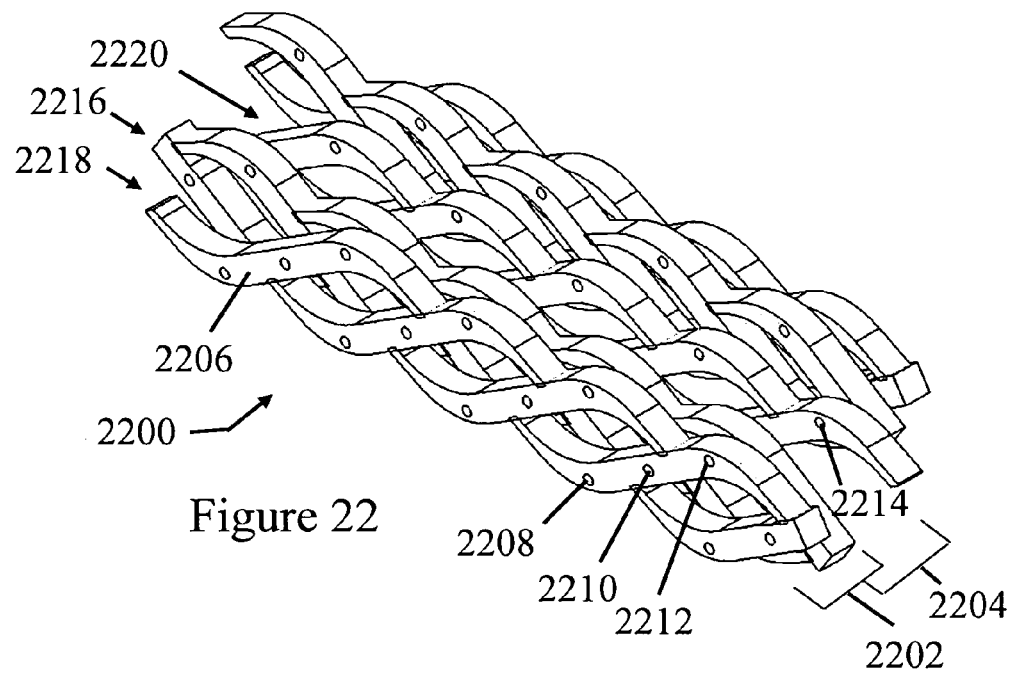
FIG. 22 is a perspective view of an embodiment of an extendable support structure in an extended state that includes adjacent lazy tongs that are offset to permit the extendable support structure to have various structural forms.

FIG. 22 shows an embodiment of an extendable support structure 2200 where one row of lazy tong members are offset from an adjacent row of lazy tong members. The offset is produced by aligning an end hole of members of one row with the central hole of members of an adjacent row. As shown, members 2206 of rows 2218 and 2216 (forming lazy tong 2202) are not offset so that a lower end hole 2208, central hole 2210, and upper end hole 2212 for members of row 2218 are aligned with a lower end hole, central hole, and upper end hole for members of row 2216. However, members 2206 of row 2220 and 2216 (forming lazy tong 2204) are offset by aligning the upper end hole of members of row 2216 with the central hole of members of row 2220, and aligning the central end hole of members of row 2216 with the lower hole of members of row 2220.

Figure 23:
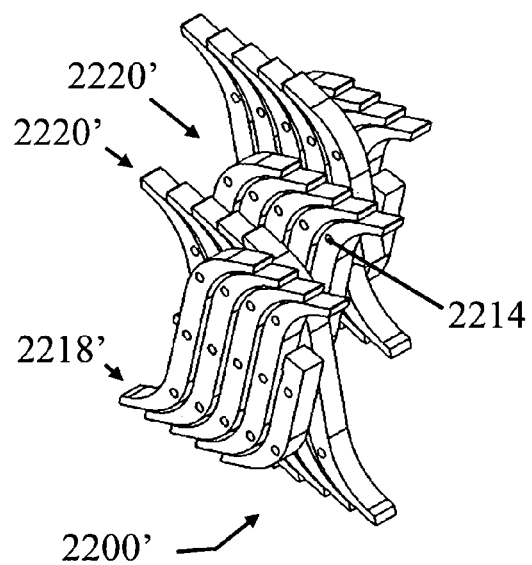
FIG. 23 is a perspective view of the embodiment of FIG. 22 in a retracted state.

As can be seen, due to the offset the upper end hole 2214 of members of row 2220 is not aligned with a hole of row 2216 and the hole 2214 is available for alignment with other members. Thus, the offset allows various structural forms to be produced such as inclinations or variations in the lateral dimension. Additionally, the extendable support structure may have a shape such as a tube that extends and retracts in length by attaching additional lazy tongs to the holes that are not aligned with holes of an adjacent member. For example, a row of members may be placed over another row such that the offset row is adjacent to both of the stacked rows of members which is repeated until a tube is completed. The offset and any resulting shape does not affect the extension and retraction capabilities, and the retracted structure 2200' having offset members and retracted rows 2216', 2218', and 2220' is shown in FIG. 23.

Figures 24, 25:
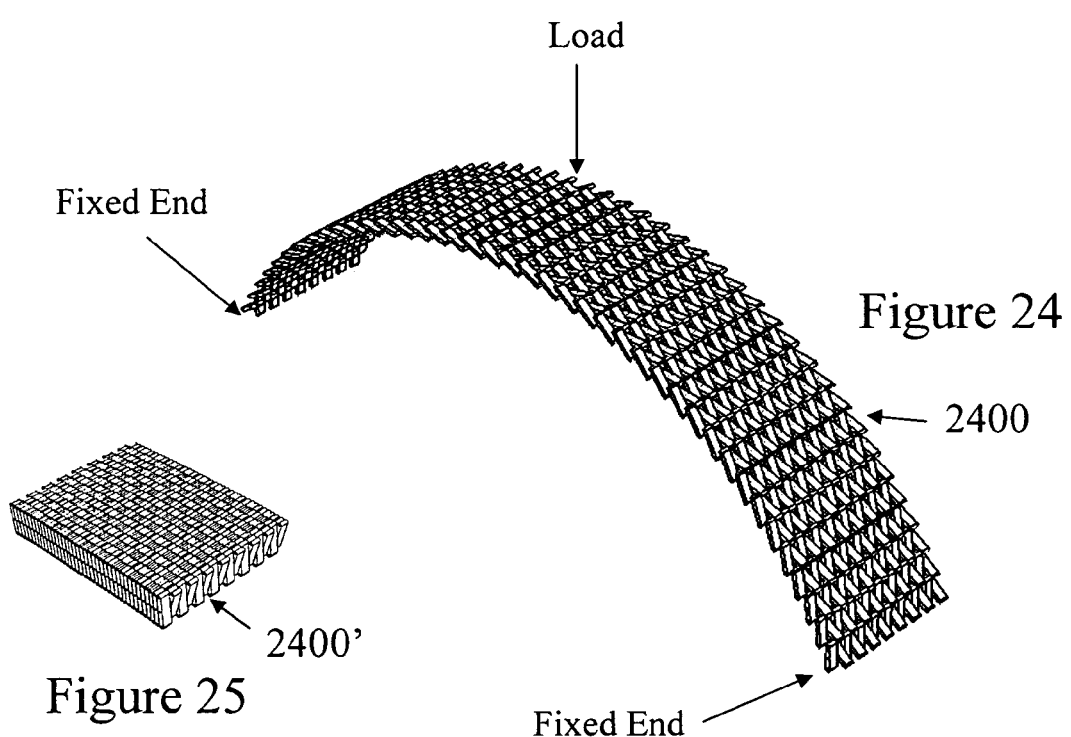
FIG. 24 is a perspective view of an embodiment of an extendable support structure in its extended state that forms an arc.
FIG. 25 is an perspective view of the embodiment of FIG. 24 in a retracted state.

FIGS. 24 and 25 show an embodiment of an extendable support structure 2400, and corresponding retracted structure 2400', that establishes an arc over the longitudinal dimension when extended to some degree. The radius of the arc increases as the structure 2400 is expanded further, and the arc prevents the structure 2400 from bowing when a load is applied. The load bearing of the extendable structure 2400 is considerably increased by fixing the ends of the arc when it is extended, such as when being used as a bridge or a roof structure. The support structure embodiment 2400 includes members having center holes that are not equidistant from the end holes to thereby produce the arc. One skilled in the art will recognize that using members having center holes that are offset so as to be non-equidistant from the end holes allows various shapes to be provided upon extension of the support structure, such as a single arc or other patterns like a sinusoid.

Figure 26:
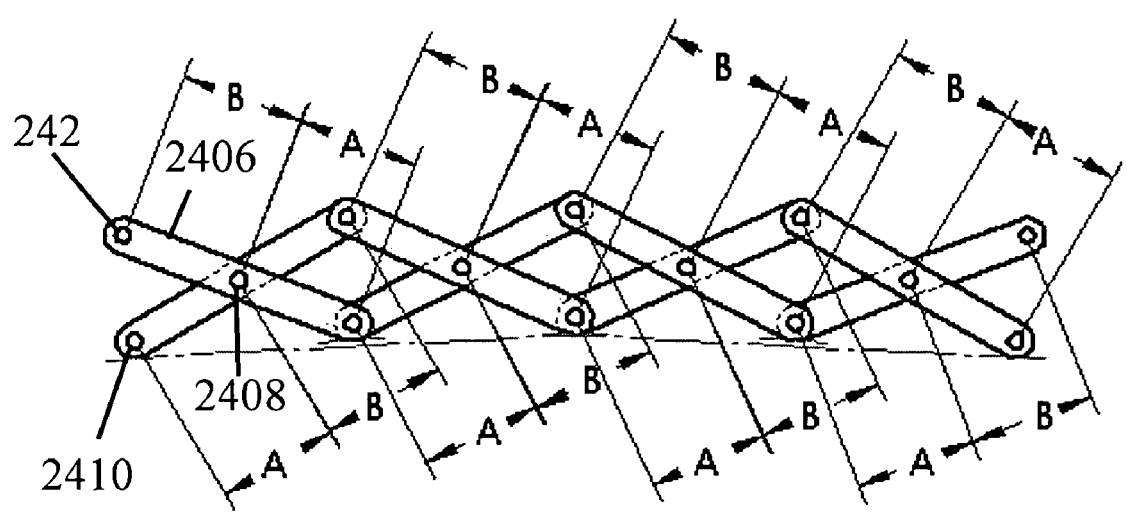
FIG. 26 is a plane view of a portion of the embodiment of FIG. 24 that illustrates the center hole relationship for the members.

For example, one member may be used throughout the arc with a center hole offset so as not to be equidistant from the end holes. FIG. 26 shows a plane view of a section of the arc that illustrates the use of a common member 2406 throughout the arc. Each member has a center hole 2408 located a distance A from one end hole 2410 and a distance B from the other end hole 2412, where A is less than B. As can be seen, the members 2406 are placed so that the lesser dimension A is on the side of the structure intended to be the inside of the arc. Although FIG. 26 shows one common member 2406 and also shows dimension A of each member on the inner side of the arc, one skilled in the art will also recognize that different members may be intermixed with member 2406 in the structure, such as where the distances of the center hole from the end holes are not A and B for the different members.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. An extendable support structure, comprising a surface that consists of adjacent lazy tongs providing a lateral dimension, wherein each lazy tong comprises a plurality of members with all members of all the adjacent lazy tongs having substantially a same member width that is in a direction of the lateral dimension, wherein the adjacent lazy tongs extend to provide a variable longitudinal dimension, and wherein the adjacent lazy tongs are fixed together laterally by multiple rigid points of attachment for each member so as to define the lateral dimension and allow the adjacent lazy tongs to extend and retract as a unit.

2. The extendable support structure of claim 1, wherein the lateral dimension is defined by three member widths.

3. The extendable support structure of claim 1, wherein the adjacent lazy tongs are connected such that each adjacent lazy tong maintains the same longitudinal dimension.

4. The extendable support structure of claim 1, wherein each member of each lazy tong is linear.

5. The extendable support structure of claim 1, wherein each member of each lazy tong is non-linear.

6. The extendable support structure of claim 5, wherein each non-linear member includes a curvature that limits the longitudinal extension to a maximum longitudinal dimension by contacting another member when the adjacent lazy tongs are extended.

7. The extendable support structure of claim 6, wherein a curvature is provided for each end of each member, and each non-linear member has a catch at each end and a notch in both sides with each notch accepting a catch from another non-linear member of the same lazy tong when the adjacent lazy tongs are extended to the maximum longitudinal dimension.

8. The extendable support structure of claim 5, wherein members of each lazy tong are asymmetrical.

9. The extendable support structure of claim 1, wherein the rigid points of connection of the members of the adjacent lazy tongs comprise an integral pin and a receptacle and wherein the adjacent lazy tongs are connected by an integral pin of one member of one lazy tong being disposed within a receptacle of one member of an adjacent lazy tong.

10. The extendable support structure of claim 1, wherein the rigid points of connection of the members of the adjacent lazy tongs comprise pins extending through the members in the lateral dimension.

11. The extendable support structure of claim 1, further comprising a load applied directly to the adjacent lazy tongs in at least a direction perpendicular to both the longitudinal and lateral dimensions.

12. The extendable support structure of claim 1, wherein the extendable support structure is attached to a truck.

13. The extendable support structure of claim 1, wherein members of the adjacent lazy tongs are plastic.

14. The extendable support structure of claim 1, wherein members have end holes and a central hole, and wherein end holes of members of one row are adjacent to central holes of members of an adjacent row.

15. The extendable support structure of claim 1, wherein each lazy tong of the plurality forms an arc over the longitudinal dimension when extended.

16. The extendable support structure of claim 15, wherein each lazy tong includes two rows of adjacent members that have end holes and a central hole and wherein the central hole is not centered between each end hole for a plurality of the members.

17. An extendable support structure, comprising adjacent lazy tongs providing a lateral dimension, and wherein the adjacent lazy tongs extend to provide a variable longitudinal dimension and the adjacent lazy tongs are fixed together laterally at at least one point, wherein each lazy tong comprises members, wherein each member of each lazy tong is non-linear, and wherein each non-linear member includes a curvature that limits the longitudinal extension to a maximum longitudinal dimension by contacting another member when the adjacent lazy tongs are extended.

18. The extendable support structure of claim 17, wherein a curvature is provided for each end of each member, and each non-linear member has a catch at each end and a notch in both sides with each notch accepting a catch from another non-linear member of the same lazy tong when the adjacent lazy tongs are extended to the maximum longitudinal dimension.

19. An extendable support structure, comprising adjacent lazy tongs providing a lateral dimension, and wherein the adjacent lazy tongs extend to provide a variable longitudinal dimension and the adjacent lazy tongs are fixed together laterally at at least one point, wherein each lazy tong comprises members, wherein each member of each lazy tong is non-linear, and wherein members of each lazy tong are asymmetrical.

20. An extendable support structure, comprising a surface that consists of adjacent lazy tongs providing a lateral dimension, wherein each lazy tong comprises a plurality of members and the lateral dimension is defined by at least four member widths, wherein the adjacent lazy tongs extend to provide a variable longitudinal dimension, and wherein the adjacent lazy tongs are fixed together laterally by multiple rigid points of attachment for each member so as to define the lateral dimension and allow the adjacent lazy tongs to extend and retract as a unit.

21. The extendable support structure of claim 20, wherein the adjacent lazy tongs are connected such that each adjacent lazy tong maintains the same longitudinal dimension.

22. The extendable support structure of claim 20, wherein each member of each lazy tong is linear.

23. The extendable support structure of claim 20, wherein each member of each lazy tong is non-linear.

24. The extendable support structure of claim 23, wherein each non-linear member includes a curvature that limits the longitudinal extension to a maximum longitudinal dimension by contacting another member when the adjacent lazy tongs are extended.

25. The extendable support structure of claim 24, wherein a curvature is provided for each end of each member, and each non-linear member has a catch at each end and a notch in both sides with each notch accepting a catch from another non-linear member of the same lazy tong when the adjacent lazy tongs are extended to the maximum longitudinal dimension.

26. The extendable support structure of claim 23, wherein members of each lazy tong are asymmetrical.

27. The extendable support structure of claim 20, wherein the rigid points of connection of the members of the adjacent lazy tongs comprise an integral pin and a receptacle and wherein the adjacent lazy tongs are connected by an integral pin of one member of one lazy tong being disposed within a receptacle of one member of an adjacent lazy tong.

28. The extendable support structure of claim 20, wherein the rigid points of connection of the members of the adjacent lazy tongs comprise pins extending through the members in the lateral dimension.

* * * * *